United States Patent
Guo et al.

(10) Patent No.: US 10,424,952 B2
(45) Date of Patent: Sep. 24, 2019

(54) BISTAGE TEMPERATURE DEVICE USING POSITIVE TEMPERATURE COEFFICIENT MATERIAL

(71) Applicant: Littelfuse, Inc., Chicago, IL (US)

(72) Inventors: Weiqing Guo, Palo Alto, CA (US); Jianhua Chen, Sunnyvale, CA (US)

(73) Assignee: Littelfuse, Inc., Chicago, IL (US)

( * ) Notice: Subject to any disclaimer, the term of this patent is extended or adjusted under 35 U.S.C. 154(b) by 78 days.

(21) Appl. No.: 15/874,316

(22) Filed: Jan. 18, 2018

(65) Prior Publication Data
US 2019/0222040 A1 Jul. 18, 2019

(51) Int. Cl.
| | | |
|---|---|---|
| *H01M 10/46* | (2006.01) | |
| *H02J 7/00* | (2006.01) | |
| *H02H 3/20* | (2006.01) | |
| *H02H 9/02* | (2006.01) | |
| *H02H 5/04* | (2006.01) | |
| *H02H 7/18* | (2006.01) | |
| *H02H 9/04* | (2006.01) | |

(52) U.S. Cl.
CPC .......... *H02J 7/0031* (2013.01); *H02H 3/20* (2013.01); *H02H 5/04* (2013.01); *H02H 7/18* (2013.01); *H02H 9/026* (2013.01); *H02H 9/042* (2013.01)

(58) Field of Classification Search
CPC ........ H02J 7/0091; H02J 7/047; H02J 7/0042; H02J 7/355
USPC ...................................... 320/107, 150, 153
See application file for complete search history.

(56) References Cited

U.S. PATENT DOCUMENTS

| | | | | |
|---|---|---|---|---|
| 5,142,266 | A | * 8/1992 | Friese | G01K 7/223 338/22 R |
| 6,152,597 | A | * 11/2000 | Potega | G01K 1/02 374/185 |
| 8,690,867 | B2 | * 4/2014 | Dunning | A61B 18/16 606/32 |
| 2005/0062582 | A1 | 3/2005 | Feichtinger et al. | |
| 2005/0206494 | A1 | * 9/2005 | Ko | H01C 1/144 338/22 R |

(Continued)

FOREIGN PATENT DOCUMENTS

| | | |
|---|---|---|
| CN | 204462924 U | 7/2015 |
| GB | 2113025 A | 7/1983 |
| JP | S5443531 A | 6/1979 |

OTHER PUBLICATIONS

International Search Report and Written Opinion for the International Patent Application No. PCT/US19/13965, dated Apr. 9, 2019, 6 pages.

*Primary Examiner* — Edward Tso

(57) ABSTRACT

A bi-stage temperature device may include a low temperature component, comprising a negative temperature coefficient (NTC) material; and a high temperature component, mechanically coupled to the low temperature component, and comprising a positive temperature coefficient (PTC) material, and a flexible substrate. The low temperature component may be arranged to generate a low temperature transition, the low temperature transition comprising a first change in electrical resistance, from a first resistance to a second resistance at a first temperature. The high temperature component may be arranged to generate a high temperature transition, the high temperature transition comprising a second change in electrical resistance, from a third resistance to a fourth resistance at a second temperature.

14 Claims, 4 Drawing Sheets

(56) References Cited

U.S. PATENT DOCUMENTS

2018/0019505 A1    1/2018    Fan et al.

\* cited by examiner

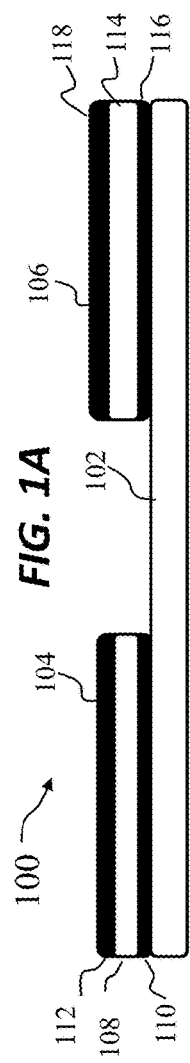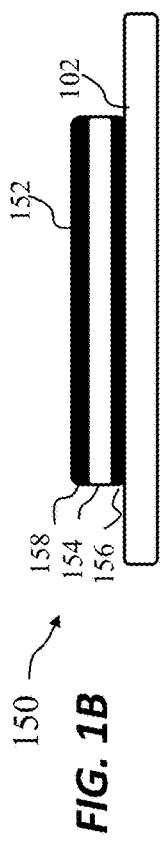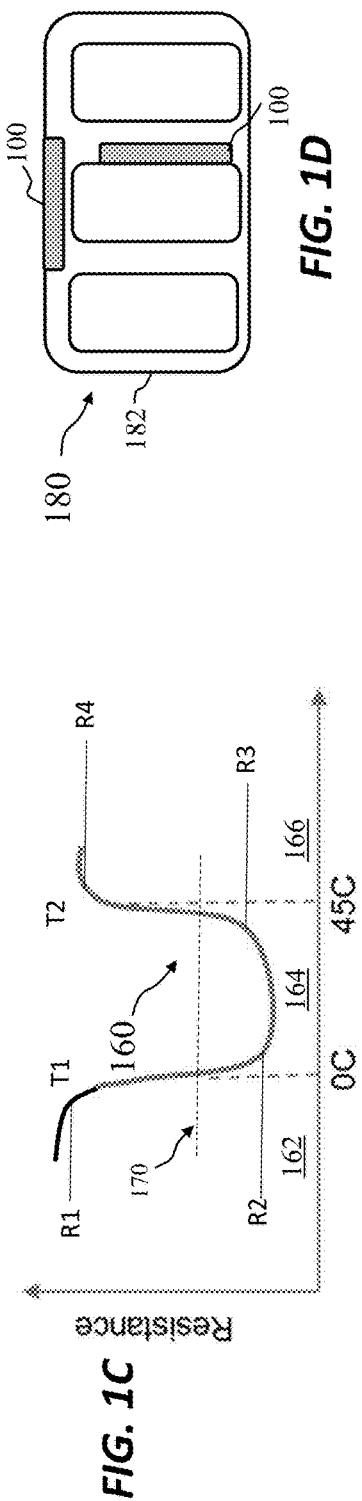

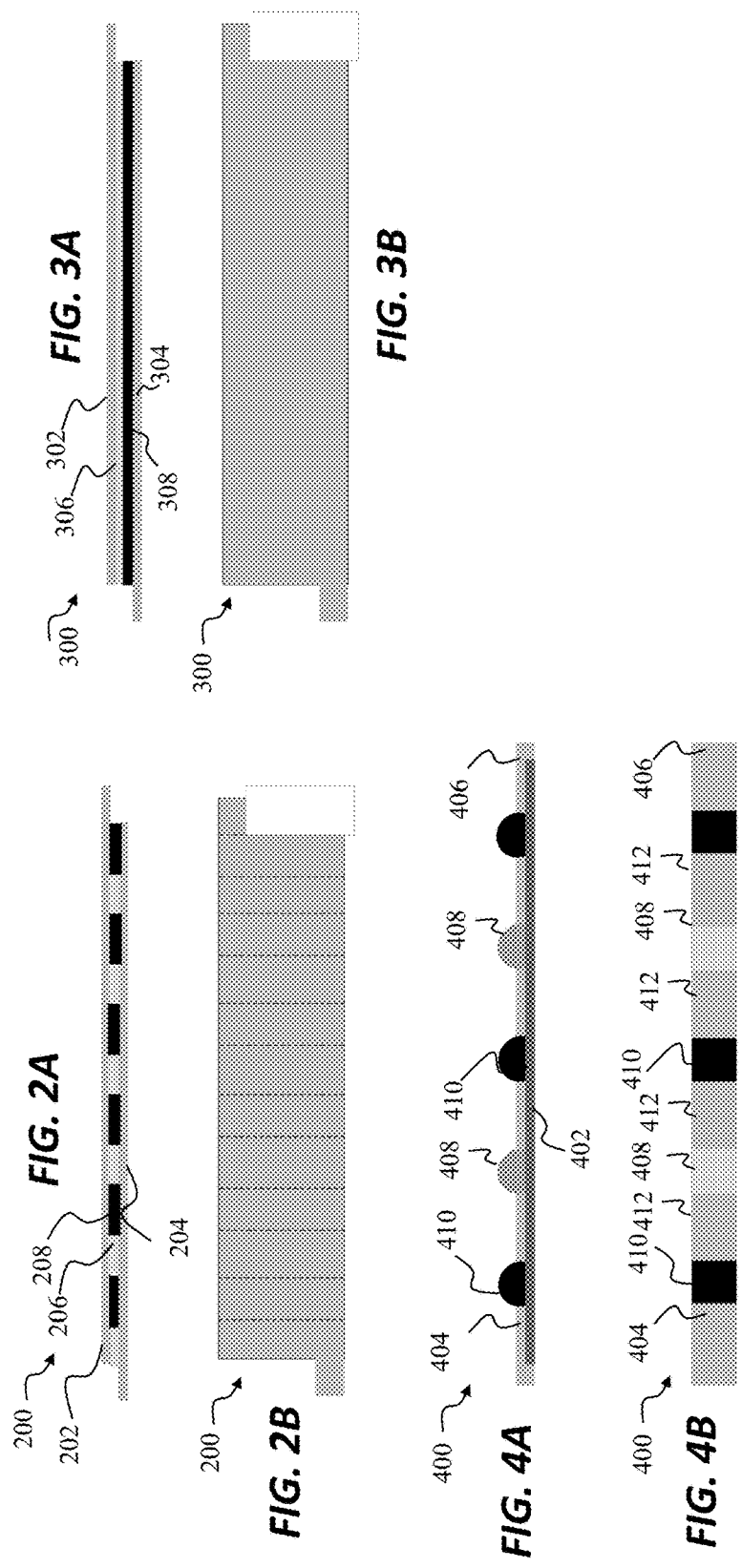

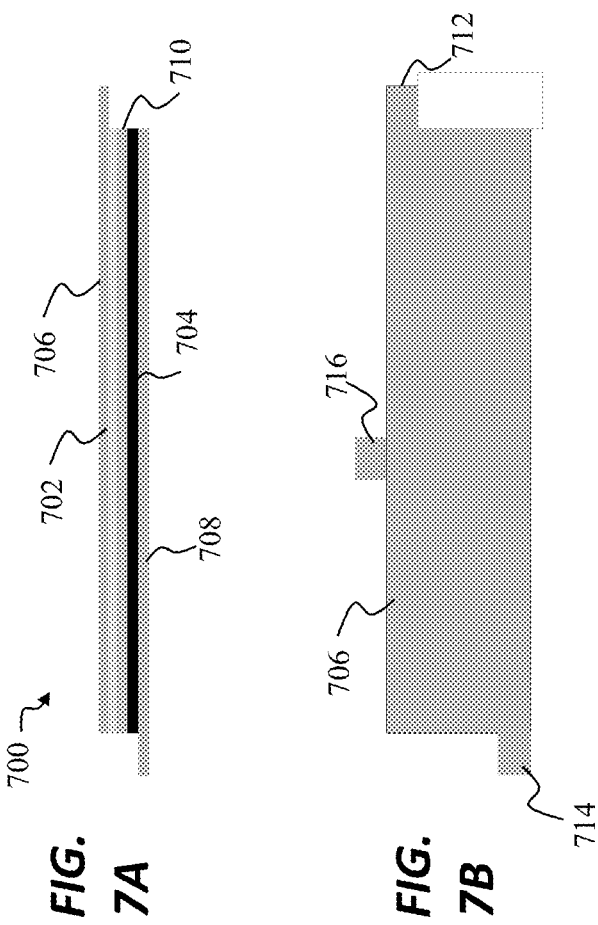

BISTAGE TEMPERATURE DEVICE USING POSITIVE TEMPERATURE COEFFICIENT MATERIAL

BACKGROUND

Field

Embodiments relate to the field of surge protection devices, and more particularly to overvoltage protection devices and resettable fuses.

Discussion of Related Art

Batteries are used in many mobile applications. Charging these batteries present challenges to prevent over-charging, over temperature and short-circuit. There are often sophisticated integrated circuit controls provided that monitor the voltage, current and temperatures of batteries packs. In some current battery pack protection schemes, a negative temperature coefficient (NTC) temperature sensors is installed to monitor the temperature of the battery pack. In most of the cases, the NTC temperature sensor is fixed in a set location of the battery pack. This limits the ability to accurately monitor temperature in different locations. Moreover, since the charging operation is affected by the ambient temperature, some battery pack makers may specify the charging operation to take place just within a specified temperature range. Beyond this specified temperature range, the charging operation should be prevented.

With respect to these and other considerations, the present disclosure is provided.

SUMMARY

Exemplary embodiments are directed to improved materials and devices based upon the PTC materials and NTC materials. In one embodiment, a bi-stage temperature device may include a low temperature component, comprising a negative temperature coefficient (NTC) material; and a high temperature component, mechanically coupled to the low temperature component, and comprising a positive temperature coefficient (PTC) material, and a flexible substrate. The low temperature component may be arranged to generate a low temperature transition, the low temperature transition comprising a first change in electrical resistance, from a first resistance to a second resistance at a first temperature. The high temperature component may be arranged to generate a high temperature transition, the high temperature transition comprising a second change in electrical resistance, from a third resistance to a fourth resistance at a second temperature.

In another embodiment, a battery pack system may include a battery pack; and at least one bi-stage temperature device, adjoined to the battery pack in at least one location. The at least one bi-stage temperature device may include a low temperature component, the low temperature component comprising a negative temperature coefficient (NTC) material; and a high temperature component, mechanically coupled to the low temperature component, the high temperature component comprising a positive temperature coefficient (PTC) material, wherein the bi-stage temperature device comprises a flexible substrate.

BRIEF DESCRIPTION OF THE DRAWINGS

FIG. 1A depicts an example of a bi-stage temperature device, shown as sensor, in accordance with embodiments of the disclosure;

FIG. 1B illustrates a flexible sensor according to further embodiments of the disclosure;

FIG. 1C depicts a curve showing electrical behavior of a bi-stage temperature device having a PTC material;

FIG. 1D depicts a battery pack system, according to embodiments of the disclosure;

FIG. 2A and FIG. 2B depicts a flexible sensor, in side cross-sectional view and top plan view, respectively, according to some embodiments of the disclosure;

FIG. 3A and FIG. 3B depicts a flexible sensor, in side cross-sectional view and top plan view, respectively, according to some embodiments of the disclosure;

FIG. 4A and FIG. 4B depicts a flexible sensor, in side cross-sectional view and top plan view, respectively, according to some embodiments of the disclosure;

FIG. 7A and FIG. 7B depict a flexible sensor, in side cross-sectional view and top plan view, respectively, according to some embodiments of the disclosure.

DESCRIPTION OF EMBODIMENTS

Figures 5A, 5B, 6A, 6B:
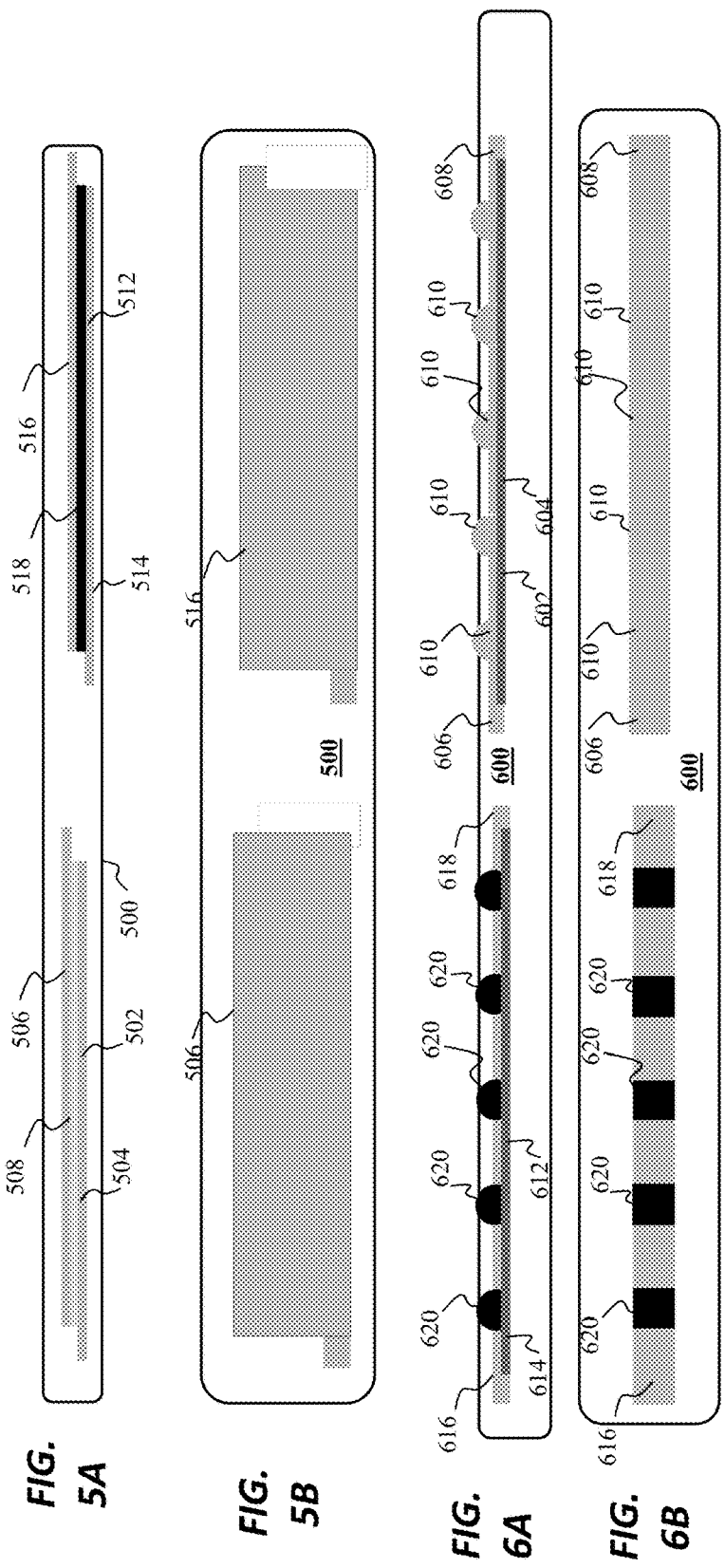
FIG. 5A and FIG. 5B depicts a flexible sensor, in side cross-sectional view and top plan view, respectively, according to some embodiments of the disclosure.
FIG. 6A and FIG. 6B depict a flexible sensor, in side cross-sectional view and top plan view, respectively, according to some embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", may mean "or", may mean "exclusive-or", may mean "one", may mean "some, but not all", may mean "neither", and/or may mean "both", although the scope of claimed subject matter is not limited in this respect.

In various embodiments, novel device structures and materials are provided for forming a bi-stage temperature device, where the bi-stage temperature device may have a low temperature component and a high temperature component, arranged to change electrical conductivity of the bi-stage temperature device at two different temperatures. According to various embodiments, the low temperature component may be a negative temperature coefficient (NTC) material, while the high temperature device may be a PTC material.

According to various embodiments, a bi-stage temperature device may act as a temperature sensor that is cost effective, yet be able to detect temperatures in multiple locations. In some embodiments, multiple components including a low temperature component and high temperature component may be printed on a substrate or made into a flexible film. As such, a flexible bi-stage temperature device such as a flexible film, may exhibit an electrical resistance that is sensitive to temperature at a selected temperature range that is designed for operation of a system such as a battery pack.

FIG. 1A depicts an example of a bi-stage temperature device, shown as flexible sensor 100, in accordance with embodiments of the disclosure. The flexible sensor 100 includes a flexible substrate 102, a low temperature component 104, disposed on the flexible substrate 102, and a high temperature component 106, also disposed on the flexible substrate 102. The low temperature component 104 is mechanically coupled to the high temperature component 106 through the flexible substrate 102. In other embodiments of a sensor, a low temperature component and high temperature component may be mechanically coupled to one another by being disposed on different substrates, connected to one another. An advantage of the flexible substrate 102, is that the flexible sensor 100 may be placed in a variety of locations, such as different locations in a battery pack. Additionally, in some embodiments, the flexible sensor 100 may include adhesive components that facilitate joining of the flexible sensor 100 to other apparatus, such as a battery pack. FIG. 1D depicts a battery pack system 170, according to embodiments of the disclosure, where a plurality of flexible sensors 100 are joined to a battery pack 172 in different locations.

In accordance with various embodiments, the flexible substrate 102 may be polyethylene terephthalate, polyethylene, polyimide, polyvinylchloride, polystyrene, paper, cardboard or other flexible substrate. The flexible substrate 102 may be provided with or without an adhesive feature (not shown in FIG. 1A) on the none-printed side. The flexible substrate 102 may also be provided with or without a protective layer (not shown in FIG. 1A) on the printed side.

According to various embodiments, at a first temperature, the low temperature component 104 exhibits a first transition in electrical resistance, a low temperature transition, from a first resistance to a second resistance. At a second temperature, relatively higher than the first temperature, the high temperature component 106 exhibits a second transition in electrical resistance from a third resistance to a fourth resistance. According to some embodiments, the electrical resistance may be relatively stable between the first temperature and the second temperature, or may vary within an acceptable range. As such, the second resistance may be similar to the third resistance.

In the example of FIG. 1A, the low temperature component 104 may include a first electrode 110, disposed directly on the flexible substrate 102, an active component 108, disposed on the first electrode 110, and a second electrode 112, disposed on the active component 108, where the first electrode 110 and second electrode 112 are disposed on opposite sides of the active component 108. As such, the active component 108 may undergo a low temperature transition at a first temperature, generating a change in electrical resistance between the first electrode 110 and the second electrode 112. In the example of FIG. 1A, the high temperature component 106 may include a third electrode 116, disposed directly on the flexible substrate 102, an active component 114, disposed on the third electrode 116, and a fourth electrode 118, disposed on the active component 114, where the third electrode 116 and fourth electrode 118 are disposed on opposite sides of the active component 114. As such, the active component 114 may undergo a high temperature transition at a second temperature, generating a change in electrical resistance between the third electrode 116 and the fourth electrode 118. In this configuration, the flexible sensor 100 may accordingly exhibit two different transitions in electrical resistance, when operated over a temperature range spanning the first temperature and the second temperature. As such, in accordance with some embodiments, the flexible sensor 100 may act to limit operation of an apparatus being protected to a temperature range between the first temperature and the second temperature.

While the flexible sensor 100 shows two separate components, in other embodiments a low temperature component and high temperature component may be incorporated in a single component. FIG. 1B illustrates a flexible sensor 150 according to further embodiments of the disclosure. The flexible sensor 150 includes a component 152, disposed on the flexible substrate 102. As explained in more detail below, the component 152 may incorporate both a low temperature component and a high temperature component within an active component 154, disposed between a bottom electrode 156 and top electrode 158. Similarly to flexible sensor 100, the flexible sensor 150 may act to limit operation of an apparatus being protected to a temperature range between a first temperature and a second temperature.

According to various embodiments of the disclosure, a flexible sensor may include a low temperature component, comprising a negative temperature coefficient (NTC) material, and may further include a high temperature component, mechanically coupled to the low temperature component, where the high temperature component comprises a positive temperature coefficient (PTC) material.

FIG. 1C depicts a curve 160, showing electrical behavior of a bi-stage temperature device having a PTC material and an NTC material formed together, such as in the configuration shown in FIG. 1A or FIG. 1B. However, the curve 160 may be generated by flexible sensors having other configurations, as detailed with respect to the embodiments of FIGS. 2A-7B to follow. The curve 160 shows electrical resistance that may be detected or output by a flexible sensor, as a function of temperature, including a low temperature regime 162, intermediate temperature regime 164, and high temperature regime 166. As illustrated, between the low temperature regime 162 and intermediate temperature regime 164, at a low temperature T1, the resistance drops between a first resistance R1 and a second resistance R2. Between the intermediate temperature regime 164 and high temperature regime 166, the resistance increases at a temperature T2 from a resistance R3 to a resistance r4. The resistance drop from R1 to R2 may be characteristic of an NTC material, incorporated into a low temperature component of the flexible sensor. The resistance increase from R3 to R4 may be characteristic of a PTC material, also incorporated into the flexible sensor.

According to various embodiments a low temperature component of a flexible sensor may be arranged with a polymer binder (polymer matrix) comprising 10%-60% by volume, an NTC powder, dispersed within the polymer matrix, and comprising 20%-70% by volume, as well as an additive, comprising 5%-10% by volume.

In some examples, the negative temperature coefficient (NTC) material may comprise a plurality of particles having a negative temperature coefficient. In particular examples, the plurality of particles of the NTC material are semiconductor particles. In various embodiments, the negative temperature coefficient material comprises a plurality of ceramic particles. In some embodiments, the plurality of ceramic particles comprises a spinel crystal structure oxide. More particularly, the plurality of ceramic particles may comprise a Ni—Mn—O material, a Ni—Mn—Cu—O material, a Ti—Fe—O material, an Al-modified spinel structure, or a Si-modified spinel structure. The embodiments are not limited in this context. In various embodiments, the plurality of NTC particles, such as ceramic particles, may be dispersed in a polymer matrix and may have a diameter of 0.01 µm to 100 µm. The embodiments are not limited in this context.

In various embodiments, a polymer binder for the NTC material may be thermoplastic polyurethanes, polyesters, polyacrylates, polysiloxanes, halogenated vinyl or vinylidene polymers, polyamide copolymers, phenoxy resins, polyethers, polyketones, polyvinyl butyral, polyvinyl pyrrolidone, polyacrylates and mixtures thereof. Additionally, a binder, different from and in addition to a first binder, may be used to form an NTC material, where the second binder may be ethylene vinyl acetate polymers, poly vinyl alcohol, ethylene alkyl acrylate copolymers and mixtures thereof. The embodiments are not limited in this context.

In one specific example of an NTC material may be formed from 35% epoxy by volume, 60% NTC powder by volume, and 5% modifier by volume. Depending upon the exact formulation and NTC material, in some embodiments, the first temperature, meaning the temperature where resistance drops rapidly, may be anywhere in the range of −50 C to +15 C. Advantageously, the NTC material may be formed in a discrete low temperature sensor; within a flexible sensor that includes a low temperature component (the NTC material) and a high temperature component, such as a PTC material; or within a single sensor component that functions as both an NTC and PTC material.

In various embodiments, a high temperature component of a flexible sensor may comprise a wax matrix material, a polymer matrix material (binder), intermixed with the wax matrix material, a conductive powder dispersed within the wax matrix material and the polymer matrix material, a conductive powder, dispersed within the second polymer matrix material and wax matrix material, and an additive, dispersed within the second polymer matrix material and wax matrix material. Except in embodiments where a PTC material and NTC material are incorporated into the same body or active component, the polymer matrix and additives used for a high temperature component may or may not be different from the polymer matrix and additives used for a low temperature component.

In various embodiments, the polymer matrix may be any suitable polymer, such as in known polymer PTC (PPTC) materials, including polymers, copolymers, elastomers, and so forth. In some embodiments, a composition of a high temperature component of a flexible sensor may include 20%-70% paraffin by volume, 10%-50% elastomer or copolymer by volume, as well 15%-50% conductive powder by volume, and 10%-50% additive by volume. Examples of suitable elastomers include polyisobutylene, polyurethanes, poly vinyl alcohol. The embodiments are not limited in this context.

In some embodiments of a high temperature component, the conductive powder may be formed from a metal, metal ceramic, or other conductive material including, for example, tungsten carbide, titanium carbide, carbon, nickel, TiN, ZrC, or NbC, carbon black, metal carbides such as VC, ZrC, NbC, TaC, MoC, HfC, metal borides such as $TiB_2$, $VbB_2$, $ZrB_2$, $NbB_2$, $MoB_2$, $HfB_2$, metal nitrides such as ZrN, as well as metals such as nickel, copper, silver coated copper, tin coated copper, as well as mixtures thereof.

In particular, non-limiting embodiments, the conductive powder may have a particle size between 0.1 µm and 100 µm. In various embodiments, the polymer matrix of a PTC material may be formed from a semicrystalline material such as polyvinylindene difluoride, polyethylene, polyethylene tetrafluoroethylene, ethylene-vinyl acetate, or ethylene butyl acrylate, or other materials having similar characteristics, including PFA (perfluoroalkoxyalkane), ETFE (ethylene tetrafluoroethylene), and ECTFE In one specific embodiment, a high temperature component may be formed from 39 vol % paraffin, 18 vol % polyurethane, 9 vol % ethylene vinyl acetate, 25 vol % carbon powder, and 9 vol % plasticizer. Advantageously, in accordance with some embodiments, the paraffin material of a high temperature component may be tailored to have a melting temperature between 40° C. and 110° C., in order to tune the temperature of the high temperature transition.

Returning to FIG. 1C, the curve 160 illustrates a low temperature transition that takes place at a value of T1 of approximately zero degrees Celsius, where the resistance of a flexible sensor decreases from R1 to R2. In various embodiments, this decrease in resistance may be on the order of one order of magnitude, two orders of magnitude, three orders of magnitude, or more. The curve 160 also shows a high temperature transition that takes place at a value of T2 of approximately 45° C., where an increase in resistance from R3 to R4 may represent a change over one order of magnitude, two orders of magnitude, three orders of magnitude, four orders of magnitude, or more. As such, the curve 160 represents possible performance of a flexible sensor for use in controlling battery operation. For example, a flexible sensor exhibiting the electrical characteristics of curve 160 may be attached to a battery apparatus at one or more locations, to regulate operation of the battery. In one example, operation of the battery may be permitted just when resistance of the sensor lies below a threshold 170, as shown. Otherwise, charging of the battery is not permitted when the resistance of the flexible sensor exceeds the threshold 170. Because of the characteristic of the curve 160, determined by the NTC material and PTC material of the flexible sensor, the resistance lies below the threshold 170 just between approximately 0° C. and 45° C., limiting battery charging to this temperature range. By adjusting the formulations for NTC material and PTC material, this temperature range or window can be tuned to the device being controlled or protected.

In accordance with various embodiments of the disclosure, the low temperature component and high temperature component may assume different configurations in a flexible sensor that acts as a bi-stage temperature device. A hallmark of such flexible sensors is that two different transitions in electrical conductivity (and, conversely, in electrical resistivity) may take place when the flexible sensor is exposed to different temperatures over a targeted temperature range. FIG. 2A and FIG. 2B depicts a flexible sensor 200, in side cross-sectional view and top plan view, respectively, according to some embodiments of the disclosure. The flexible sensor 200 includes a first electrode 202, a second electrode 204, and a plurality of components arranged between the first electrode 202 and the second electrode 204. In this configuration, the high temperature component is distributed in a plurality of high temperature portions 208. The low temperature component, which component is also distributed in a plurality of low temperature portions 206, interspersed with the plurality of high temperature portions. The plurality of low temperature portions 206 may all be formed of a same, low temperature material, such as a polymer matrix including a NTC powder, disposed therein. Likewise, the plurality of high temperature portions 208 may all be formed of a same, high temperature material, such as a polymer matrix including a conductive powder, disposed therein. Accordingly, at a given temperature, such as a temperature characteristic of a sharp drop in electrical resistance (resistivity) of the NTC powder, the plurality of low temperature portions 206 may undergo a drop in electrical resistance, generating a drop in overall resistance between the first electrode 202 and second electrode 204. Likewise, at a given second temperature, such as a temperature characteristic of a sharp increase in electrical resistance (resistivity) of the PTC material, the plurality of high temperature portions 208 may undergo an increase in electrical resistance, generating an increase in overall resistance between the first electrode 202 and second electrode 204.

FIG. 3A and FIG. 3B depicts a flexible sensor 300, in side cross-sectional view and top plan view, respectively, according to some embodiments of the disclosure. In this configuration, a first electrode 302 is connected to a low temperature component 306, arranged as a first layer, while a second electrode 304 is connected to a high temperature component 308, arranged as a second layer. As shown, the low temperature component 306 is arranged adjacent to the high temperature component 308, and these components are arranged in electrical series between the first electrode 302 and the second electrode 304. Accordingly, at a low temperature characteristic of a transition in the low temperature component 306, such as a sharp drop in resistance of an NTC material, the overall resistivity between the first electrode 302 and the second electrode 304 may decrease according to the known relationship for series resistors. Accordingly, at a high temperature characteristic of a transition in the high temperature component 308, such as a sharp increase in resistance of a PTC material, the overall resistivity between the first electrode 302 and the second electrode 304 may increase according to the known relationship for series resistors.

FIG. 4A and FIG. 4B depicts a flexible sensor 400, in side cross-sectional view and top plan view, respectively, according to some embodiments of the disclosure. In this embodiment, the flexible sensor 400 includes a flexible substrate 402, and a low temperature component and high temperature component, disposed on one side of the flexible substrate 402. In some embodiments, the high temperature component and low temperature component may be printed on the flexible substrate 402 according to known techniques. In the example of FIG. 4A, the low temperature component is arranged as a plurality of low temperature portions 408, while the high temperature component is arranged as a plurality of high temperature portions 410. The plurality of high temperature portions 410 may be dispersed between the plurality of low temperature portions 408, as shown. The flexible sensor 400 further includes a first electrode 404 and a second electrode 406, arranged at different regions on the surface of the flexible substrate 402. Electrically conductive regions 412 are arranged between the plurality of high temperature portions 410 and plurality of low temperature portions 408. For example, the electrically conductive regions 412 may be printed on the flexible substrate 402. As such, the plurality of high temperature portions 410 and plurality of low temperature portions 408 are arranged in electrical series between the first electrode 404 and the second electrode 406. In this example, the overall resistance behavior generated by the flexible sensor 400 may resemble that shown in FIG. 1C, for example, when the plurality of low temperature portions 408 are an NTC material and the plurality of high temperature portions are a PTC material.

FIG. 5A and FIG. 5B depict a flexible sensor 500, in side cross-sectional view and top plan view, respectively, according to some embodiments of the disclosure. In this embodiment, a low temperature component 508 is arranged as a first layer in a first sensor portion 502 and a high temperature component 518 is arranged as a second layer in a second sensor portion 512. The first sensor portion 502 further comprises a first sensor electrode 504, disposed on a first side of the low temperature component 508 and a second sensor electrode 506, disposed on a second side of the low temperature component 508. The second sensor portion 512 further comprises a third sensor electrode 514, disposed on a first side of the high temperature component 518 and a fourth sensor electrode 516, disposed on a second side of the high temperature component 518. While not shown explicitly, in one embodiment, the first sensor portion 502 and the second sensor portion 512 may be arranged in electrical series, wherein the overall resistance behavior generated by the flexible sensor 500 may resemble that shown in FIG. 1C, for example, when the low temperature component 508 is composed of an NTC material and the high temperature component is composed of a PTC material.

FIG. 6A and FIG. 6B depict a flexible sensor 600, in side cross-sectional view and top plan view, respectively, according to some embodiments of the disclosure. The flexible sensor 600 may include a low temperature component, arranged in a first sensor portion 602, and a high temperature component, arranged in a second sensor portion 612, wherein the first sensor portion 602 further includes a first flexible substrate portion 604 and the second sensor portion 612 includes a second flexible substrate portion 614.

The first sensor portion 602 also includes a first sensor electrode 606 and a second sensor electrode 608. The first sensor electrode 606 may be disposed in or on a first region of the first flexible substrate portion 604, such as toward one end region of the first flexible substrate portion 604, as shown. The second sensor electrode 608 may be disposed on a second region of the first flexible substrate portion 604, such as toward another end region of the first flexible substrate portion 604. As shown, the low temperature component comprises a plurality of low temperature portions 610, disposed on the first flexible substrate portion 604, and arranged in electrical series between the first sensor electrode 606 and the second sensor electrode 608. In various embodiments, the plurality of low temperature portions 610 may be an NTC material, as described above. Accordingly, when the flexible sensor 600 is placed in an environment where the temperature changes over a range that coincides with a decrease in resistivity of the NTC material, a large drop in resistance between the first sensor electrode 606 and the second sensor electrode 608 may take place.

The second sensor portion 612 also includes a third sensor electrode 616 and a fourth sensor electrode 618. The third sensor electrode 616 may be disposed in or on a first region of the second flexible substrate portion 614, such as toward one end region of the second flexible substrate portion 614, as shown. The fourth sensor electrode 618 may be disposed on a second region of the second flexible substrate portion 614, such as toward another end region of the second flexible substrate portion 614. As shown, the high temperature component comprises a plurality of high temperature portions 620, disposed on the second flexible substrate portion 614, and arranged in electrical series between the third sensor electrode 616 and the fourth sensor electrode 618. In various embodiments, the plurality of high temperature portions 620 may be a PTC material, as described above. Accordingly, when the flexible sensor 600 is placed in an environment where the temperature changes over a range that coincides with an increase in resistivity of the PTC material, a large increase in resistance between the third sensor electrode 616 and the fourth sensor electrode 618 may take place.

In some embodiments, the first sensor portion 602 and the second sensor portion 612 may be electrically coupled to one another, wherein the first sensor portion 602 and the second sensor portion 612 may be arranged in electrical series with one another. In other embodiments, first sensor portion 602 and the second sensor portion 612 may function independently of one another. In some embodiments, the first sensor portion 602 and the second sensor portion 612 may be mechanically coupled to one another, such as through a common housing, a common substrate, or other mechanism. In other embodiments, the first sensor portion 602 may be at least partially decoupled from the second sensor portion 612, wherein the distance between the first sensor portion 602 and the second sensor portion 612 may be changed, wherein the substrate orientation may differ between the first sensor portion 602 and the second sensor portion 612, and so forth.

FIG. 7A and FIG. 7B depict a flexible sensor 700, in side cross-sectional view and top plan view, respectively, according to some embodiments of the disclosure. In this embodiment, a low temperature component 702 and a high temperature component 704 are arranged in electrical series between first electrode 706 a second electrode 708. In this example, the low temperature component 702 and high temperature component 704 are arranged as sheets. The flexible sensor 700 also includes a third electrode 710, disposed between the low temperature component 702 and the high temperature component 704. The third electrode may be arranged as a sheet, for example. The flexible sensor 700 further includes a first output lead 712, connected to the first electrode 706, a second output lead 714, connected to the second electrode 708, and a third output lead 716, connected to the third electrode 710.

As such, the resistance between different portions of the flexible sensor 700 may be independently or combinationally measured. For example, the resistance between the first output lead 712 and the third output lead 716 provides a measure of the resistance of the low temperature component 702, while the resistance between the second output lead 714 and third output lead 716 provides a measure of the resistance of the high temperature component 704. The resistance between the first output lead 712 and the second output lead 714 provides a measure of the series resistance of the low temperature component 702 and the high temperature component 704.

In the aforementioned embodiments, while certain specific temperature ranges have been discussed in conjunction with low temperature regime, intermediate temperature regime, and high temperature regime, according to different embodiments, the exact temperatures that define these regimes may be adjusted by adjusting one or more parameters. Among these parameters are the volume fraction of conductive particles; the shape of conductive particles; the type of polymer material, such as thermoset, thermoplastic, crystalline, semi-crystalline, amorphous; the transition temperature of a polymer; the type of ceramic material and composition of the ceramic used for NTC particles, the shape of the NTC particles, the doping of a ceramic structure with additives such as Si or Al, among other factors. Similarly, the electrical resistance of the intermediate temperature regime, as well as the change in resistance in the low temperature regime and high temperature regime may be adjusted by adjusting one or more of the aforementioned parameters.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A bi-stage temperature device, comprising:
a low temperature component, the low temperature component comprising a negative temperature coefficient (NTC) material; and
a high temperature component, mechanically coupled to the low temperature component, the high temperature component comprising a positive temperature coefficient (PTC) material;
wherein the low temperature component is arranged to generate a low temperature transition, the low temperature transition comprising a first change in electrical resistance, from a first resistance to a second resistance at a first temperature; and
wherein the high temperature component is arranged to generate a high temperature transition, the high temperature transition comprising a second change in electrical resistance, from a third resistance to a fourth resistance at a second temperature, and
wherein the bi-stage temperature device comprises a flexible substrate.

2. The bi-stage temperature device of claim 1, further comprising:
a first electrode; connected to the low temperature component; and
a second electrode, connected to the high temperature component, wherein the low temperature component and the high temperature component are arranged in a first layer and a second layer, respectively, the first layer and the second layer being in electrical series between the first electrode and the second electrode.

3. The bi-stage temperature device of claim 1, further comprising:
a first electrode; and
a second electrode, disposed opposite the first electrode, wherein the low temperature component and the high temperature component are arranged in electrical parallel fashion between the first electrode and the second electrode.

4. The bi-stage temperature device of claim 3, wherein the low temperature component comprises a plurality of low temperature portions, and wherein the high temperature component comprises a plurality of high temperature portions, wherein the plurality of high temperature portions are interspersed with the plurality of low temperature portions.

5. The bi-stage temperature device of claim 1, wherein the low temperature component is arranged as a first layer in a first sensor portion and the high temperature component is arranged as a second layer in a second sensor portion, wherein the first sensor portion further comprises:
a first sensor electrode, disposed on a first side of the low temperature component; and
a second sensor electrode, disposed on a second side of the low temperature component; and
wherein the second sensor portion further comprises:

a third sensor electrode, disposed on a first side of the high temperature component; and a fourth sensor electrode, disposed on a second side of the high temperature component.

6. The bi-stage temperature device of claim 1, wherein the low temperature component is arranged in a first sensor portion and the high temperature component is arranged in a second sensor portion, wherein the first sensor portion further comprises:

a first flexible substrate portion;

a first sensor electrode, disposed in a first region of the first flexible substrate portion; and a second sensor electrode, disposed on a second region of the first flexible substrate portion, wherein the low temperature component comprises a plurality of low temperature portions, disposed on the first flexible substrate portion, and arranged in electrical series between the first sensor electrode and the second sensor electrode; and wherein the second sensor portion further comprises:

a second flexible substrate portion;

a third sensor electrode, disposed in a first region of the second flexible substrate portion; and a fourth sensor electrode, disposed in a second region of the second flexible substrate portion, wherein the high temperature component comprises a plurality of high temperature portions, disposed on the second flexible substrate portion, and arranged in electrical series between the third sensor electrode and the fourth sensor electrode.

7. The bi-stage temperature device of claim 3, further comprising:

a third electrode, disposed between the low temperature component and the high temperature component;

a first output lead, connected to the first electrode;

a second output lead, connected to the second electrode; and a third output lead, connected to the third electrode.

8. The bi-stage temperature device of claim 1, wherein the low temperature component and the high temperature component are arranged in a common layer.

9. The bi-stage temperature device of claim 1, wherein the low temperature component comprises a first polymer matrix material, an NTC powder, dispersed within the first polymer matrix, and a first additive, dispersed within the first polymer matrix material.

10. The bi-stage temperature device of claim 1, wherein the high temperature component comprises a wax matrix material, a second polymer matrix material, intermixed with the wax matrix material, a conductive powder dispersed within the wax matrix material and the second polymer matrix material, a conductive powder, dispersed within the second polymer matrix material and wax matrix material, and a second additive, dispersed within the second polymer matrix material and wax matrix material.

11. The bi-stage temperature device of claim 1, wherein the first temperature is between −50° C. and 15° C., and wherein the second temperature is between 40° C. to 110° C.

12. The bi-stage temperature device of claim 1, wherein the flexible substrate comprises a flexible substrate portion, wherein the flexible substrate portion comprises polyethylene terephthalate, polyethylene, polyimide, polyvinylchloride, polystyrene, paper, or cardboard.

13. The bi-stage temperature device of claim 12, further comprising:

an adhesive component, disposed on a non-printed side of the flexible substrate portion; and a protective layer, disposed on a printed side of the flexible substrate portion.

14. A battery pack system, comprising:

a battery pack; and at least one bi-stage temperature device, adjoined to the battery pack in at least one location, the at least one bi-stage temperature device comprising:

a low temperature component, the low temperature component comprising a negative temperature coefficient (NTC) material; and a high temperature component, mechanically coupled to the low temperature component, the high temperature component comprising a positive temperature coefficient (PTC) material, wherein the bi-stage temperature device comprises a flexible substrate.

* * * * *